US011609995B2

(12) United States Patent
Hajost et al.

(10) Patent No.: US 11,609,995 B2
(45) Date of Patent: Mar. 21, 2023

(54) GUARD RAILED SECURITY BENCHMARK IMPLEMENTATION ASSURANCE

(71) Applicant: SteelCloud, LLC, Ashburn, VA (US)

(72) Inventors: Brian H. Hajost, Great Falls, VA (US); Matthew Richard Heimlich, Lovettsville, VA (US); Fredi Jaramiilo, Ashburn, VA (US)

(73) Assignee: SteelCloud, LLC, Ashburn, VA (US)

( * ) Notice: Subject to any disclaimer, the term of this patent is extended or adjusted under 35 U.S.C. 154(b) by 120 days.

(21) Appl. No.: 16/869,548

(22) Filed: May 7, 2020

(65) Prior Publication Data
US 2021/0350002 A1    Nov. 11, 2021

(51) Int. Cl.
*G06F 21/57*    (2013.01)

(52) U.S. Cl.
CPC ........ *G06F 21/57* (2013.01); *G06F 2221/034* (2013.01)

(58) Field of Classification Search
CPC ........................... G06F 21/57; G06F 2221/034
See application file for complete search history.

(56) References Cited

U.S. PATENT DOCUMENTS

| | | | |
|---|---|---|---|
| 10,467,003 B1* | 11/2019 | Mendonca | G06F 8/73 |
| 2005/0138557 A1* | 6/2005 | Bolder | H04L 41/0826 |
| | | | 715/700 |
| 2017/0090954 A1* | 3/2017 | Bose | G06F 9/453 |
| 2021/0110044 A1* | 4/2021 | Price | G06F 21/577 |

* cited by examiner

*Primary Examiner* — Beemnet W Dada
(74) *Attorney, Agent, or Firm* — CRGO Global; Steven M. Greenberg

(57) ABSTRACT

Guard-railed security benchmark compliance assurance includes storing in memory of a computer a multiplicity of specific parameter values, retrieving from memory, different parameterized operating system directives arranged together in a programmatic module, populating different parameters of the directives with respective ones of the stored specific parameter values and invoking each of the directives with the populated different parameters through a command line shell of an operating system executing in the computer, each invocation establishing a different configuration setting in a computing environment hosted by the computer.

12 Claims, 2 Drawing Sheets

GUARD RAILED SECURITY BENCHMARK IMPLEMENTATION ASSURANCE

BACKGROUND OF THE INVENTION

Field of the Invention

The present invention relates to the field of security benchmark implementation and more particularly to automating security benchmark compliance in a target computing device.

Description of the Related Art

A security benchmark is a collection best practices guidelines specified to secure a computing platform. Examples include those controls specified by the Center for Internet Security (CIS) and those controls specified by the United States government in the form of a Security Technical Implementation Guide (STIG). A STIG is a configuration standard for devices and computing systems confirming to governmentally mandated information assurance (IA), generally information security. Published by the United States Defense Information Security Agency (DISA), each STIG contains technical guidance to secure an information system that might otherwise be vulnerable to a malicious computer attack. At present, DISA has published nearly five-hundred STIGs, and continues to do so with regularity. Consequently, configuring an information system to be in compliance with one or more STIGs is an ongoing process requiring significant expertise.

Because complying with the changing landscape defined by the ongoing development of STIGs can seem daunting, DISA provides both requirements and tools for validating and implementing the security requirements. In this regard, there are several common testing tools that implement STIGs. Some tools have been developed privately, while others have been developed publicly within the various agencies of government. There are even tools that have been developed to encompass a particular category of system components, such as network components, or a particular functional process, such as log aggregation and analysis.

For the most part, in the personal computing environment, configuration systems consistent with the requirements of an applicable benchmark are applied through the use of command line directives input through a command line shell. In the garden variety command line shell, a directive may be manually keyed by the operator directing the inspection of a value of a configuration setting of interest, or the establishment of a value for a configuration setting of interest. Most command line shells also will accept a script of multiple directives and rudimentary program logic. Advanced forms of the modern command line shell, however, receive programmatic modules with capabilities beyond simple scripts. Even still, the granular control facilitated by the command line shell in setting configuration parameters provides a fertile environment for human error. Providing a pre-constructed script correspondent to a particular benchmark to an end user for manual editing likewise presents an opportunity for the introduction of error in the process.

BRIEF SUMMARY OF THE INVENTION

Embodiments of the present invention address deficiencies of the art in respect to managing security benchmark compliance in a host computing platform through the use of a command line shell, and provide a novel and non-obvious method, system and computer program product for guard-railed security benchmark compliance assurance. In an embodiment of the invention, a method for guard-railed security benchmark compliance assurance includes storing in memory of a computer a multiplicity of specific parameter values pertaining to security benchmark compliance. The method also includes retrieving from memory, different parameterized operating system directives arranged together in a programmatic module, and populating different parameters of the directives with respective ones of the stored specific parameter values. Finally, the method includes invoking each of the directives with the populated different parameters through a command line shell of an operating system executing in the computer, each invocation establishing a different configuration setting, in furtherance of security benchmark compliance, in a computing environment hosted by the computer.

In one aspect of the embodiment, the invoking is a background operation occurring concurrently with a contemporaneously executing foregoing computing operation. In another aspect of the embodiment, the command line shell is a task automation framework to the operating system and included as part of the operating system.

In another embodiment of the invention, a data processing system is configured for guard-railed security benchmark compliance assurance. The system includes a host computing platform that includes one or more computers, each with memory and at least one processor. The system also includes a security benchmark compliance assurance module. The module includes computer program instructions enabled upon execution in the host computing platform to store in the memory of the host computing platform, a multiplicity of specific parameter values and to retrieve from the memory, different parameterized operating system directives arranged together in a programmatic module. The program instructions additionally are enabled to populate different parameters of the directives with respective ones of the stored specific parameter values. Finally, the program instructions are enabled to invoke each of the directives with the populated different parameters through a command line shell of an operating system executing in the host computing platform such that each invocation establishes a different configuration setting in a computing environment hosted by the host computing platform.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for guard-railed security benchmark compliance assurance. In accordance with an embodiment of the invention, a registry of command-line shell modules, each referring to a different command-line shell task, is presented in a user interface and one or more of the modules selected. One or more of the modules are then selected in the user interface and corresponding parameters are specified in the user interface for each of the selected modules in respect to a security benchmark. In response, directives within each of the selected modules are modified to incorporate the corresponding parameters, and the selected modules are submitted to a command line shell of an operating system for a target computing environment. The command line shell executes each of the submitted modules to generate a configuration script and the command line shell then interprets the configuration script so as to apply configuration settings to the target computing environment to render the target computing environment compliant with the security benchmark. In this way, an operator can configure the target computing environment for security benchmark compliance without being provided an opportunity for error resulting from exposure to the granular directives executable in the command line shell.

Figure 1:
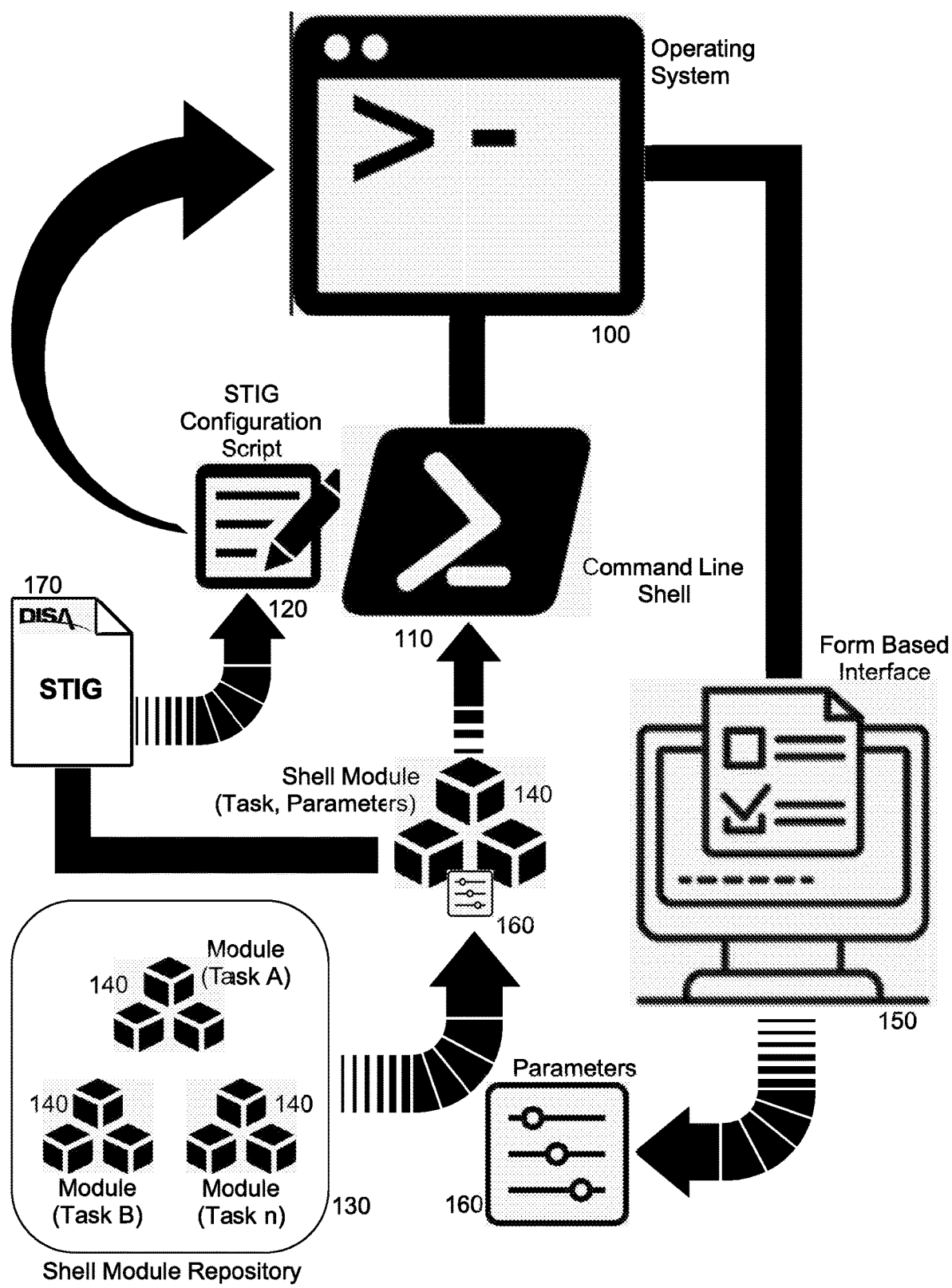
FIG. 1 is a pictorial illustration of a process for guard-railed security benchmark compliance assurance.

In further illustration, FIG. 1 pictorially shows a process for guard-railed security benchmark compliance assurance. As shown in FIG. 1, a shell module repository 130 includes multiple different modules 140 adapted for use in a command line shell 110 for operating system 100. Each of the different modules 140 includes one or more directives sufficient to achieve a different task performable by the command line shell 110. Each of the directives of the different modules 140 further provides for zero or more parameters. Within a user interface 150, a selection of different ones of the modules 140 is received along with one or more parameters 160 specified for each one of the modules 140. The selection of the different ones of the modules 140 and the specification of the parameters 160 for each one of the modules directs a configuration of the operating system 100 in compliance with a security benchmark 170 such as a STIG.

Each one of the modules 140 is then modified to include corresponding ones of the parameters 160 and is submitted to the command line shell 110. The command line shell 110 in turn processes each one of the modules 140 as modified with the corresponding parameters 160 to produce a configuration script 120 interpretable in the command line shell 110 so as to configure the operating system 100 in compliance with the security benchmark 170. Finally, the command line shell 110 interprets the configuration script 120 to configure the operating system 100 using the corresponding specified parameters 160. The configuration of the operating system 100 in turn renders the operating system 100 to be in compliance with the security benchmark 170 without having permitted the end user to edit the configuration script 120 manually.

Figure 2:
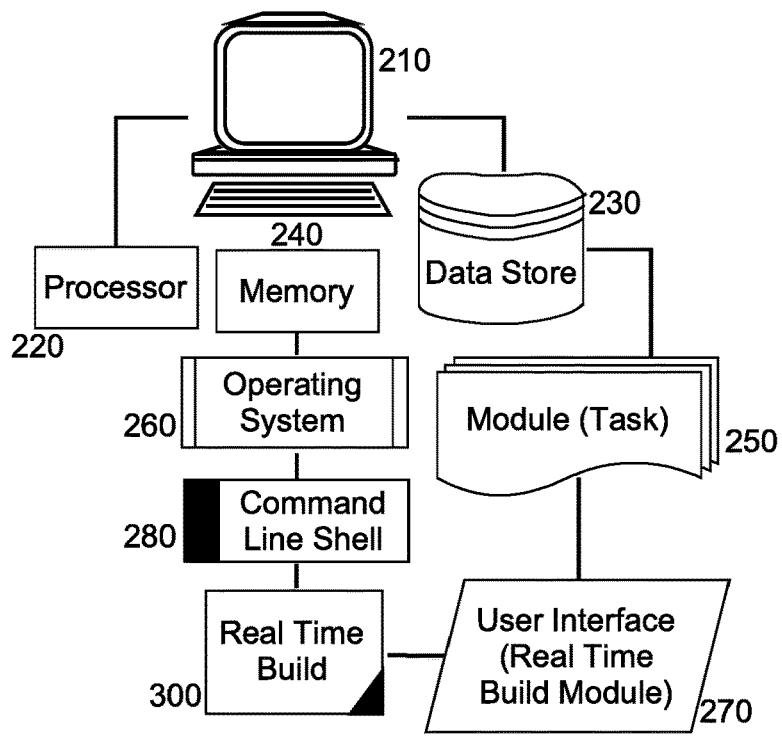
FIG. 2 is a schematic illustration of a data processing system configured for guard-railed security benchmark compliance assurance; and, FIG. 3 is a flow chart illustrating a process for guard-railed security benchmark compliance assurance.

The process described in connection with FIG. 1 may be implemented within a data processing system. In further illustration, FIG. 2 schematically illustrates a data processing system configured for guard-railed security benchmark compliance assurance. The system includes a host computing platform 210 that has one or more computers, each with at least one processor 220, fixed storage 230 and memory 240. An operating system 260 executes in the memory 240 by the processor 220 and provides a command line shell 280 that is a task automation framework included as part of the operating system 260 and that executes as a background task while a foregoing computing task executes concurrently. A real time build module 300 executes through the operating system 260 and provides a user interface 270 through which data is presented and user input received.

The real time build module 300 includes computer program instructions. The instructions are enabled during execution by the at least one processor 220 to retrieve a set of modules 250, each corresponding to a different task performable in the command line shell 280. The program instructions further are enabled to present a user interface control within the user interface 270 through which one of the modules 250 may be selected. The program instructions yet further are enabled to present a user interface control in the user interface 270 through which a parameter is specified by the end user for the selected one of the modules 250. The program instructions even yet further are enabled to modify the selected one of the modules 250 with the specified parameter and to submit the modified selected one of the modules 250 to the command line shell 280 for conversion into a script that in interpretable by the command line shell 280 into different commands sufficient to establish a configuration of at least one parameter of the operating system 260 in compliance with a security benchmark such as a STIG, or in the alternative, a benchmark published by CIS.

Figure 3:
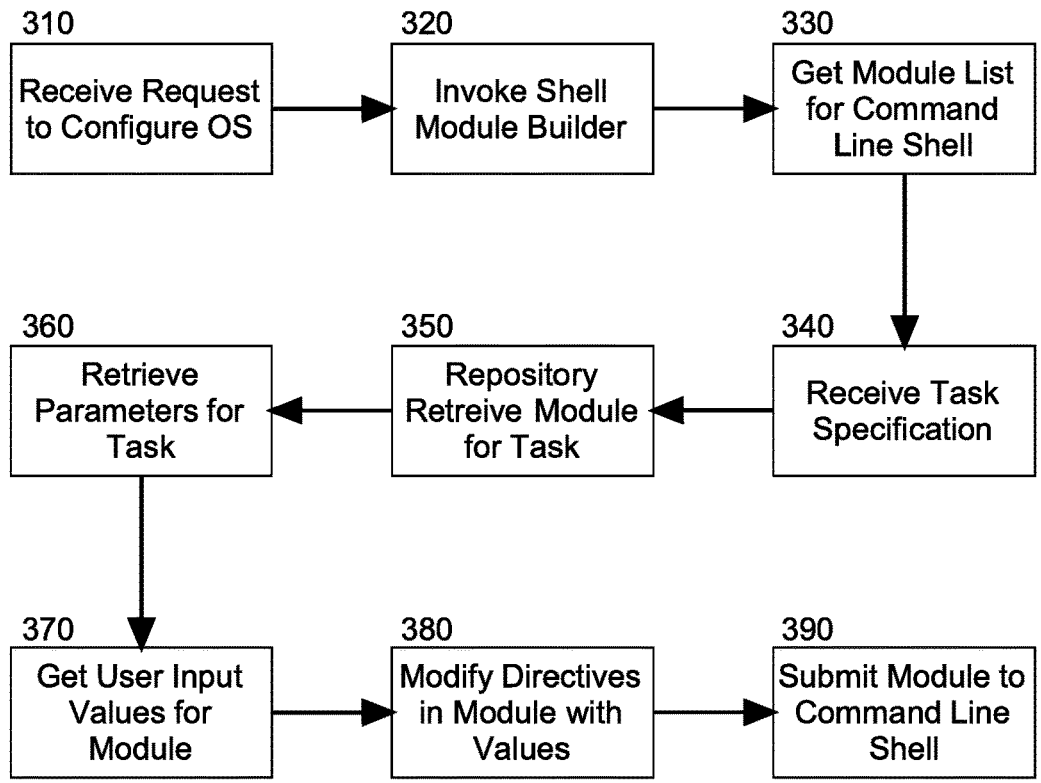

In yet further illustration of the operation of the real time build module 300, FIG. 3 is a flow chart illustrating a process for guard-railed security benchmark compliance assurance. Beginning in block 310, a request is received to configure the operating system in compliance with a security benchmark. In block 320, the real time build module is invoked and in block 330, a list of modules available in a repository for use in configuring the operating system for the security benchmark is presented in a user interface to the build module. Then, in block 350, a selected one of the modules is retrieved from the repository, the selected module corresponding to a particular task performable in the command line shell in furtherance of security benchmark compliance.

In block 360, one or more parameters for the task represented by the selected module are retrieved from the selected module and in block 370, one or more user interface controls are presented in the user interface for completion by the end user. In block 380, once the values for each user interface control are received, one or more directives included in the selected module are modified to incorporate the specified values. Finally, in block 390 the selected module as modified to incorporate the specified values are submitted to the command line shell which in turn, generates in memory a configuration script which is then interpreted by the command line shell to establish configuration settings in the operating system in compliance with the security benchmark. Of note, once interpreted, the configuration script is removed from memory and not persisted to fixed storage so as to avoid the possibility of the end user manually modifying the configuration script.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

I claim:

1. A method for guard-railed security benchmark compliance assurance comprising:
   storing in memory of a computer a multiplicity of specific parameter values;
   retrieving from memory, different parameterized operating system directives arranged together in a programmatic module;
   populating different parameters of the directives with respective ones of the stored specific parameter values; and,
   invoking each of the directives with the populated different parameters through a command line shell of an operating system executing in the computer, each invocation establishing a different configuration setting in a computing environment hosted by the computer by modifying the programmatic module with the populated different parameters and to submit the modified programmatic module to the command line shell for conversion into a script that in interpretable by the command line shell into different commands sufficient to establish a configuration of at least one of the parameters in compliance with a security benchmark.

2. The method of claim 1, wherein the invoking is a background operation occurring concurrently with a contemporaneously executing foregoing computing operation.

3. The method of claim 1, wherein the command line shell is a task automation framework to the operating system and included as part of the operating system.

4. The method of claim 1, wherein the security benchmark is a Security Technical Implementation Guide (STIG).

5. A data processing system configured for guard-railed security benchmark compliance assurance, the system comprising:
   a host computing platform comprising one or more computers, each with memory and at least one processor; and,
   a security benchmark compliance assurance module comprising computer program instructions enabled upon execution in the host computing platform to perform:
   storing in the memory of the host computing platform, a multiplicity of specific parameter values;
   retrieving from memory, different parameterized operating system directives arranged together in a programmatic module;
   populating different parameters of the directives with respective ones of the stored specific parameter values; and,
   invoking each of the directives with the populated different parameters through a command line shell of an operating system executing in the host computing platform, each invocation establishing a different configuration setting in a computing environment hosted by the host computing platform by modifying the programmatic module with the populated different parameters and to submit the modified programmatic module to the command line shell for conversion into a script that in interpretable by the command line shell into different commands sufficient to establish a configuration of at least one of the parameters in compliance with a security benchmark.

6. The system of claim 5, wherein the invoking is a background operation occurring concurrently with a contemporaneously executing foregoing computing operation.

7. The system of claim 5, wherein the command line shell is a task automation framework to the operating system and included as part of the operating system.

8. The system of claim 5, wherein the security benchmark is a Security Technical Implementation Guide (STIG).

9. A computer program product for guard-railed security benchmark compliance assurance, the computer program product including a non-transitory computer readable storage medium having program instructions embodied therewith, the program instructions executable by a device to cause the device to perform a method including:
   storing in memory of a computer a multiplicity of specific parameter values;
   retrieving from memory, different parameterized operating system directives arranged together in a programmatic module;
   populating different parameters of the directives with respective ones of the stored specific parameter values; and,
   invoking each of the directives with the populated different parameters through a command line shell of an operating system executing in the computer, each invocation establishing a different configuration setting in a computing environment hosted by the computer by modifying the programmatic module with the populated different parameters and to submit the modified programmatic module to the command line shell for conversion into a script that in interpretable by the command line shell into different commands sufficient to establish a configuration of at least one of the parameters in compliance with a security benchmark.

10. The computer program product of claim 9, wherein the invoking is a background operation occurring concurrently with a contemporaneously executing foregoing computing operation.

11. The computer program product of claim 9, wherein the command line shell is a task automation framework to the operating system and included as part of the operating system.

12. The computer program product of claim 9, wherein the security benchmark is a Security Technical Implementation Guide (STIG).

* * * * *